(12) United States Patent
Liu et al.

(10) Patent No.: US 10,684,896 B2
(45) Date of Patent: Jun. 16, 2020

(54) METHOD FOR PROCESSING ASYNCHRONOUS EVENT BY CHECKING DEVICE AND CHECKING DEVICE

(71) Applicant: Tsinghua University, Beijing (CN)

(72) Inventors: Leibo Liu, Beijing (CN); Ao Luo, Beijing (CN); Shaojun Wei, Beijing (CN)

(73) Assignee: Tsinghua University, Beijing (CN)

(*) Notice: Subject to any disclaimer, the term of this patent is extended or adjusted under 35 U.S.C. 154(b) by 235 days.

(21) Appl. No.: 15/895,977

(22) Filed: Feb. 13, 2018

(65) Prior Publication Data
US 2018/0239655 A1    Aug. 23, 2018

(30) Foreign Application Priority Data

Feb. 20, 2017 (CN) ............ 2017 1 0089783
May 8, 2017 (CN) ............ 2017 1 0316446

(51) Int. Cl.
G06F 9/54 (2006.01)
G06F 9/48 (2006.01)

(52) U.S. Cl.
CPC ............ *G06F 9/542* (2013.01); *G06F 9/4881* (2013.01)

(58) Field of Classification Search
None
See application file for complete search history.

(56) References Cited

U.S. PATENT DOCUMENTS 6,470,376 B1 * 10/2002 Tanaka ............... G06F 9/30087
375/E7.093
6,751,751 B1    6/2004 Murray
(Continued)

FOREIGN PATENT DOCUMENTS

CN    101950259 A    1/2011
CN    103186435 A    7/2013
(Continued)

OTHER PUBLICATIONS

Chinese Application No. 201710316446.9, Notice on Granting the Patent Right for Invention, dated Aug. 2, 2019, with translation, 3 pages.
Chinese Application No. 201710316446.9, Third Office Action dated May 13, 2019, with translation, 11 pages.
U.S. Appl. No. 15/894,042, Office Action, dated Jul. 8, 2019, 27 pages.
U.S. Appl. No. 15/895,992, Office Action, dated Jun. 28, 2019, 40 pages.
(Continued)

*Primary Examiner* — Duy Khoung T Nguyen
*Assistant Examiner* — Melissa A Headly
(74) *Attorney, Agent, or Firm* — Fish & Richardson P.C.

(57) ABSTRACT

A method for processing an asynchronous event by a checking device and a checking device are provided, the method including: obtaining an instruction position where a checked processor executes an asynchronous event during a target running process; and executing the asynchronous event at the instruction position during executing a task of the target running process in a manner conforming to predefined behavior, wherein the predefined behavior is a hardware behavior standard of the processor. Obtaining the instruction position and executing the asynchronous event at the instruction position may cause the checking device and the checked processor to process the same asynchronous event at the same instruction position. In this way, during performing security checking on a processor, the method and the device according to the embodiments of the present disclosure may be used to eliminate the influence of the uncertainty factor of the asynchronous event.

9 Claims, 3 Drawing Sheets

(56) References Cited

U.S. PATENT DOCUMENTS

| | | |
|---|---|---|
| 6,757,831 B1 | 6/2004 | Folmsbee |
| 7,188,219 B2 | 3/2007 | Jeddeloh |
| 7,373,521 B1 | 5/2008 | Kawahara |
| 7,664,937 B2 | 2/2010 | Jacob et al. |
| 7,941,569 B2 | 5/2011 | Parthasarathy et al. |
| 8,336,767 B1 | 12/2012 | Graef et al. |
| 8,533,834 B1 | 9/2013 | Wong et al. |
| 8,713,370 B2 | 4/2014 | Millet et al. |
| 8,996,817 B2 | 3/2015 | Bushen |
| 9,069,953 B2 | 6/2015 | Bellocchio et al. |
| 9,268,959 B2 | 2/2016 | Paczkowski et al. |
| 9,275,238 B2 | 3/2016 | Wang |
| 9,747,446 B1 | 8/2017 | Pidathala et al. |
| 9,830,269 B2 | 11/2017 | McKean et al. |
| 9,940,460 B1 | 4/2018 | Derbeko |
| 10,078,459 B1 | 9/2018 | Natanzon et al. |
| 2005/0229164 A1 | 10/2005 | Giraud |
| 2006/0090209 A1 | 4/2006 | Garay et al. |
| 2009/0307770 A1 | 12/2009 | Harris et al. |
| 2010/0017605 A1 | 1/2010 | Chieze et al. |
| 2010/0083387 A1 | 4/2010 | Rodgers et al. |
| 2010/0192194 A1 | 7/2010 | Tan et al. |
| 2012/0131387 A1 | 5/2012 | Salloum et al. |
| 2013/0238904 A1 | 9/2013 | Salgado et al. |
| 2014/0101373 A1 | 4/2014 | Lee et al. |
| 2014/0372738 A1* | 12/2014 | Mersh ................... G06F 21/575 713/2 |
| 2014/0380474 A1 | 12/2014 | Paithane et al. |
| 2015/0020211 A1 | 1/2015 | Lai et al. |
| 2016/0042179 A1 | 2/2016 | Weingarten et al. |
| 2016/0098565 A1 | 4/2016 | Vedula et al. |
| 2016/0275289 A1 | 9/2016 | Sethumadhavan et al. |
| 2016/0357660 A1 | 12/2016 | Dean et al. |
| 2016/0357966 A1 | 12/2016 | Porat et al. |
| 2017/0052868 A1 | 2/2017 | Robertson et al. |
| 2017/0228562 A1 | 8/2017 | Guilley et al. |
| 2017/0235961 A1 | 8/2017 | August et al. |
| 2017/0286670 A1 | 10/2017 | Artman et al. |
| 2017/0310688 A1 | 10/2017 | Lecomte et al. |
| 2017/0315818 A1 | 11/2017 | Shivanna et al. |
| 2017/0329966 A1 | 11/2017 | Koganti et al. |
| 2018/0032726 A1 | 2/2018 | Parinov et al. |
| 2018/0032760 A1 | 2/2018 | Hu et al. |
| 2018/0089099 A1 | 3/2018 | Raj et al. |

FOREIGN PATENT DOCUMENTS

| | | |
|---|---|---|
| CN | 103761175 A | 4/2014 |
| CN | 105224856 A | 1/2016 |
| CN | 108345787 A | 7/2018 |
| GB | 1282628 A | 7/1972 |

OTHER PUBLICATIONS

Zhang et al., "Detrust: Defeating Hardware Trust Verification with Stealthy Implicitly-Triggered Hardware Trojans", Proceedings of the 2014 ACM SIGSAC Conference on Computer and Communications Security, ACM, 2014, pp. 153-166.

Ngo et al., "Hardware Property Checker for Run-Time Hardware Trojan Detection", 2015 European Conference on Circuit Theory and Design (ECCTD), IEEE, 2015, 4 pages.

Chinese Application No. 201710089783.9, First Office Action dated Aug. 23, 2018, with translation, 22 pages.

Chinese Application No. 201710089783.9, Second Office Action dated Oct. 22, 2018, with translation, 24 pages.

Chinese Application No. 201710089783.9, Third Office Action dated Dec. 29, 2018, with translation, 10 pages.

Hongbo Gao, "Research on Detection Techniques of Instruction-triggered Hardware Trojan Horse", A Dissertation Submitted to PLA Information Engineering University for the Degree of Doctor of Engineering, Apr. 2013, with translation, 31 pages.

Chinese Application No. 201710316446.9, Second Office Action dated Jan. 3, 2019, with translation, 12 pages.

Chinese Application No. 201710316446.9, First Office Action dated Sep. 14, 2018 and translation, 6 pages.

Chinese Application No. 201710659429.5, First Office Action dated Sep. 12, 2018 and translation, 10 pages.

U.S. Appl. No. 15/895,992, Office Action, dated Oct. 22, 2019, 89 pages.

U.S. Appl. No. 15/895,686, Office Action, dated Oct. 7, 2019, 24 pages.

* cited by examiner

METHOD FOR PROCESSING ASYNCHRONOUS EVENT BY CHECKING DEVICE AND CHECKING DEVICE

CROSS-REFERENCE TO RELATED APPLICATION(S)

This application claims priority to a Chinese Patent Application No. 201710089783.9, filed with the Chinese Patent Office on Feb. 20, 2017 and entitled "method, checking device and system for determining security of a processor" and a Chinese Patent Application No. 201710316446.9, filed with the Chinese Patent Office on May 8, 2017 and entitled "method for processing asynchronous event by checking device and checking device", which are incorporated herein by reference entirely.

TECHNICAL FIELD

The present disclosure relates to the field of computer technology, and more particularly, to a method for processing an asynchronous event by a checking device and a checking device.

BACKGROUND

With the rapid development of integrated circuit technology, the scale of digital systems is rapidly increasing. Complex digital systems often include multiple processors, a large number of hardware IP (Intellectual Property) and external devices. In order to improve the efficiency of a digital system, the system will use a large number of asynchronous events in the process of operation. Due to the uncertainty of asynchronous events, its widespread existence brings great challenges to the system's security check and even the digital system's verification.

SUMMARY

In order to solve the above technical problems in the prior art, an embodiment of the present disclosure provides a method of processing an asynchronous event by a checking device and a checking device, which can align an asynchronous event executed by the checked processor to an instruction, thereby eliminating the influence of the uncertainty factor of the asynchronous event.

One aspect of the embodiments of the present disclosure provides a method of processing an asynchronous event by a checking device, the method comprising:

obtaining an instruction position where a checked processor executes an asynchronous event during a target running process; and executing the asynchronous event at the instruction position during executing a task of the target running process in a manner conforming to predefined behavior, wherein the predefined behavior is a hardware behavior standard of the processor.

Another aspect of the embodiments of the present disclosure provides a checking device, the checking device comprising:

an obtaining unit configured to obtain an instruction position where a checked processor executes an asynchronous event during a target running process; and an aligning unit configured to execute the asynchronous event at the instruction position during executing a task of the target running process in a manner conforming to predefined behavior, wherein the predefined behavior is a hardware behavior standard of the processor.

In the embodiments of the present disclosure, obtaining an instruction position where a checked processor executes an asynchronous event during a target running process and executing the asynchronous event at the instruction position may cause the checking device and the checked processor to process the same asynchronous event at the same instruction position. In this way, during performing security checking on a processor, the method and device according to the embodiments of the present disclosure may be used to eliminate the influence of the uncertainty factor of the asynchronous event. In addition, in the digital system's verification, by using the method and device according to the embodiments of the present disclosure, the difference between verification platforms at different levels of the checked system can be narrowed so as to speed up the recurrence of problems and simplify the debugging of the checked system.

BRIEF DESCRIPTION OF THE DRAWINGS

In order to more clearly illustrate technical solutions in embodiments of the present disclosure or in the prior art, the attached drawings, which are to be used in the following descriptions of the embodiments or the prior art, will be briefly described below. It is apparent that the attached drawings in the following descriptions are merely examples of the present disclosure, and other drawings may be obtained by those skilled in the art based on these drawings without creative efforts.

DETAILED DESCRIPTION

Figure 1:
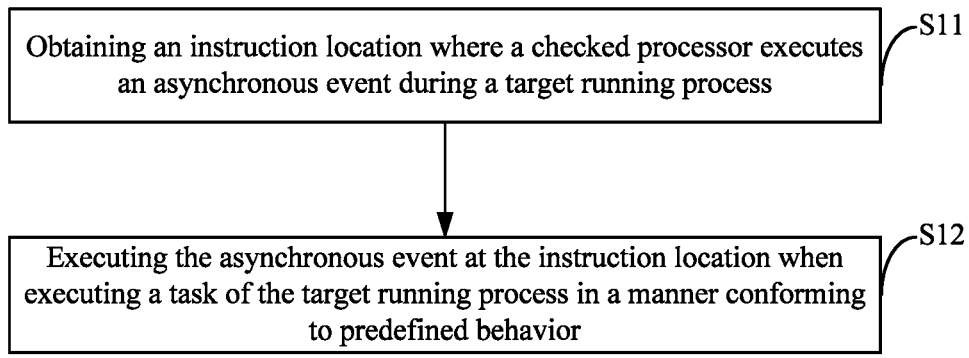
FIG. 1 is a schematic flowchart of a method of processing an asynchronous event by a checking device according to an embodiment of the present disclosure.

The technical solutions in the embodiments of the present disclosure will be described in a clear and complete manner in conjunction with the attached drawings in the embodiments of the present disclosure, and obviously, the described embodiments are merely part of the present disclosure, and not all embodiments. All other embodiments obtained by those skilled in the art based on the embodiments of the present disclosure without creative work should fall within the protection scope of the present disclosure.

Hardware security is a foundation of software security. All implementations of software security are based on an assumption that hardware is trusted, i.e., the hardware should work according to behavior defined by its manual. Currently in most cases function and performance checking for hardware is carried out during designing or leaving the factory. As hardware appears in the form of a black box in a user's system after leaving the factory (unlike software Trojan, code of which is present in a system, and can be read and analyzed), hardware behavior is difficult to be monitored or perceived. In addition, due to the difficulty in determining the reasonability of the hardware behavior, there is no research on hardware security. It should be understood that the method of processing an asynchronous event by a checking device and the checking device provided by the present disclosure can be applied not only to the above-mentioned field of hardware security checking but also to other technical fields without departing from the spirit and principle of the present disclosure, which should fall within the protection scope of the present disclosure.

In the field of security checking, the checking system needs deterministic site to determine whether the execution process and result of the checked system meets the expectation. Therefore, the uncertainty of asynchronous events makes it difficult to check the security of the checked system. Security checking of process requires the use of one or more additional systems to perform exactly the same tasks as the checked system. However, if asynchronous events, such as DMA (Direct Memory Access) operations, cannot be executed atomically (in the field of computers, if an operation is atomic, it means "one or a series of operations that cannot be interrupted". An atomic asynchronous event can be interpreted as an indivisible asynchronous event) and aligned to the instructions, there will be some uncertainty in the execution of the checking system. This uncertainty comes from the fact that the checking system cannot accurately know and achieve the exact same DMA arrival time, end time, and entire intermediate process as the checked system, thus the checking system will not be able to achieve exactly the same behavior with the checked system therefore cannot give a reasonable security determination result.

For another example, in the process of verification of complex digital systems, the problems found on a verification platform of a certain level often need to be reproduced on a lower-level verification platform to further analyze the causes and find the errors. However, there are a large number of asynchronous events in the execution process, making it difficult to accurately reproduce the behavior of multiple processors, hardware IPs, and peripherals in a digital system after replacing the platform, which brings some interference to the verification and debugging of the digital system. This is because after a problem is detected by a debugging staff, he or she cannot judge whether the problem is caused by inconsistent platform behavior or the problem is the real error, or the real error is directly obscured by such inconsistency.

In the embodiments of the present disclosure, obtaining an instruction position where a checked processor executes an asynchronous event during a target running process and executing the asynchronous event at the instruction position may cause the checking device and the checked processor to process the same asynchronous event at the same instruction position. In this way, during performing security checking on a processor, the method and device according to the embodiments of the present disclosure may be used to eliminate the influence of the uncertainty factor of the asynchronous event. In addition, in the digital system's verification, by using the method and device according to the embodiments of the present disclosure, the difference between verification platforms at different levels of the checked system can be narrowed so as to speed up the recurrence of problems and simplify the debugging of the checked system.

In particular, the checking device may be integrated with the checked processor on a same chip, or may be implemented on a separate chip, or may be implemented as other forms of devices, and the present disclosure gives no limitation hereon. For example, a portion of functions of the embodiments of the present disclosure may be integrated with the checked processor on a same chip, and the remaining functions may be implemented as a separate chip, and these variations should all fall within the protection scope of the present disclosure.

Various design considerations for security checking of a processor are further described in a U.S. application Ser. No. 15/804,188, filed on Nov. 6, 2017 and entitled "METHOD, CHECKING DEVICE, AND SYSTEM FOR DETERMINING SECURITY OF A PROCESSOR", which is incorporated herein by reference in their entirety as part of disclosure of the present application.

FIG. 1 is a schematic flowchart of a method of processing an asynchronous event by a checking device according to an embodiment of the present disclosure. As shown in FIG. 1, the method includes:

Step S11: obtaining an instruction position where a checked processor executes an asynchronous event during a target running process.

Step S12: executing the asynchronous event at the instruction position during executing a task of the target running process in a manner conforming to predefined behavior, wherein the predefined behavior is a hardware behavior standard of the processor.

Asynchronous events according to embodiments of the present disclosure may include one or more types of asynchronous events defined in the processor system, such as one or more types of interrupts, traps, DMAs, and MMIOs. It should be understood that the present disclosure does not limit the types of asynchronous events. In one embodiment, when the checked processor is connected to a peripheral device, the peripheral device may initiate a data read/write request to the connected checked processor. The data read/write operation request initiated by the peripheral device is an asynchronous event. The data read/write operation initiated by the peripheral device may include, for example, a data read/write operation such as DMA or P2P (Peer to Peer). It should be understood that asynchronous events in embodiments of the present disclosure only involves the P2P data read/write operation passing the checked processor but does not involve the P2P data read/write operation without passing the checked processor. As technology advances, the types of asynchronous events defined in the processor system may increase or decrease. Correspondingly, the types of asynchronous events involved in the present disclosure may change accordingly. It should also be understood that a user may also customize the types of asynchronous events of the present disclosure.

It should also be understood that the checked processor system may decompose an asynchronous event into multiple sub-events, and the processing method according to embodiments of the present disclosure may also be used for each sub-event after the decomposition. In this way, the present disclosure can align each sub-event, which simplifies the system design and improves the operation efficiency.

In one embodiment, a real-time running process of the checked processor may be divided into one or more checking intervals. For example, an entire running process of the checked processor from startup to shutdown may be taken as a target running process, or the entire running process may be divided into multiple target running processes corresponding to multiple checking intervals. In this way, obtaining an instruction position where the checked processor executes an asynchronous event by the checking device may be implemented as obtaining an instruction position where the checked processor executes an asynchronous event in a certain checking interval (that is, the target running process). After the checking device obtains an instruction position where the checked processor executes an asynchronous event in a current checking interval, it may further continue to obtain an instruction position where the checked processor executes an asynchronous event in a next checking interval, and then perform corresponding asynchronous events at the instruction positions. It should be understood that the embodiments of the present disclosure do not limit the number or length of the checking intervals, and that various variations of the above embodiments should fall within the protection scope of the present disclosure.

The predefined behavior is the standard of the hardware behavior of the processor, wherein the standard of the hardware behavior refers to a behavior standard of the processor in a process of parsing and executing software instruction streams. In one embodiment, the hardware behavior standard of the processor may be a behavior standard specified in a processor specification or other standardized documents. For example, for an instruction set processor, the predefined behavior may include, but is not limited to: instruction behavior specified in an instruction set implemented by the processor, behavior of responding to and processing an interrupt, and behavior of input and output ports of the processor, and the like. In one embodiment, a processor in the checking device may be designed or programmed in advance according to the hardware behavior standard of the processor, thereby enabling the checking device to conform to the predefined behavior during the running process. In another embodiment, the checking device may be implemented using a reconfigurable processor. In this case, an algorithm may be written in advance according to the hardware behavior standard of the processor and may be stored in a memory of the checking device. Thus, when the checking device is started, it can read a related algorithm from the memory and perform reconfiguration according to the algorithm, so that the checking device meets the requirements of the predefined behavior during the running process.

Since the checked processor is a black box for a user, it is unknown whether or not in an actual running process it executes a task of the target running process in a manner conforming to the predefined behavior. Therefore, it is an important basis for determining the hardware security by comparing similarities and differences between a hardware execution trace and a result of the checked processor and that of the checking device during executing a same task. Here, the predefined behavior may be defined and modified by a user, having good portability, and may be applied to security checks for different models of processors, thereby solving the problem of the hardware black box of the processors.

In one embodiment, before the checking device executes a task of the target running process in a manner conforming to predefined behavior, it is also necessary to record the asynchronous event and the instruction position where the checked processor executes the asynchronous event. During recording the asynchronous event, the identification of the asynchronous event may be recorded only, and the specific content of the asynchronous event may also be recorded, which is not limited in the present disclosure. The specific content recorded during recording asynchronous events can be preset by the user. During the running process of the processor, asynchronous event logging can be generated using software technologies such as virtual machines. Instead of using virtual machines, it is possible to use the interrupt service in the operating system layer to complete the relevant functions, or to complete the entire recording process by hardware. Of course, the way of notification is not limited to interrupts, mechanisms such as polls, and hardware cache queues can also be used as a specific implementation. When the processor is notified of the occurrence of an asynchronous event, the processor can utilize a facility such as an internal instruction counter to obtain the location where the asynchronous event occurs. Thereafter, the locations where these asynchronous events occur can be recorded using virtual machine or instrumentation. These recorded locations are the instruction positions where the checked processor executes these asynchronous events.

In one embodiment, the specific content of the asynchronous event is not recorded at the instruction position, instead, only the identification of the asynchronous event and the memory address of the specific content is recorded. In this case, the checking device needs to obtain the specific content of the asynchronous event according to the memory address. Of course, the specific content of the asynchronous event can also be recorded, but the implementation efficiency of such a solution is relatively low. Therefore, the specific content of the asynchronous event may be recorded in the recording module, and only the storage location of the asynchronous event in the recording module may be recorded at the instruction position where the asynchronous event occurs. During performing the security checking, the specific content of the asynchronous event may be obtained by accessing the recording module. During performing the security checking, the checking device aligns the asynchronous event to the instruction according to the details of the asynchronous event, and then determines the processor hardware security according to the execution result after the alignment. In specific implementation, the asynchronous event and the instruction position where the checked processor executes the asynchronous event may be recorded according to the flow shown in FIG. 2:

Step S21: parsing the asynchronous event to acquire a type of the asynchronous event.

In one embodiment, the checking device intercepts and parses the content of a PCIe (Peripheral Component Interconnect Express) packet to determine the type and specific content of the asynchronous event to occur. For example, the type of the asynchronous event may be determined according to the header information in the PCIE packet, and the specific content of the asynchronous event may be determined according to the content in the PCIe. It should be understood that the PCIe packet is only one specific embodiment, and the embodiments of the present disclosure is not limited thereto.

Step S22: determining whether the asynchronous event is a target asynchronous event according to the type of the asynchronous event. When the asynchronous event is a target asynchronous event, step S23 is performed to process it. If the asynchronous event is not a target asynchronous event, the asynchronous event is discarded without recording (step S24).

Step S23: requesting the checked processor to process the asynchronous event and recording the asynchronous event and the instruction position where the checked processor executes the asynchronous event.

For example, the asynchronous event and the instruction position where the asynchronous event is executed may be recorded in the recording device of the checking device. The recording device may be disposed between the checked processor and the peripheral device for recording a data read/write operation (i.e., asynchronous event) initiated by the peripheral device and the instruction position when the checked processor executes the data read/write operation. Of course, in the specific implementation, the record information of the data read/write operation initiated by the peripheral device may also be recorded in other positions, such as other memories of the checking device, which is not limited in the present disclosure. Taking recording the record information in the recording device as an example, since the data read/write operation initiated by the peripheral device is an asynchronous event with respect to the checked processor.

When the recording device records the data read-write operation initiated by the peripheral device, the checking device may request the checked processor to process the data read/write operation initiated by the peripheral device. During receiving the instruction sent by the checked processor, the recording device sends the packet of the data read/write operation initiated by the peripheral device to the checked processor. Upon receiving the request sent by the recording device, the checked processor suspends execution of the current instruction stream and then executes the data read/write operation initiated by the peripheral device. At this moment, the checking device may record the data read/write operation initiated by the peripheral device and the current instruction position (that is, the instruction position where the checked processor executes the data read/write operation initiated by the peripheral device) by using the recording device. Specifically, the checking device may use an interrupt manner to request the checked processor to suspend execution of the instruction stream and then turn to execute the data read/write operation initiated by the peripheral device. In this way, when the checking device checks the security of the checked processor, it obtains the data read/write operation initiated by the peripheral device and the instruction position, so as to execute the data read/write operation initiated by the peripheral device at the instruction position.

The embodiments of the present disclosure can eliminate the influence of the uncertainty caused by the asynchronous data read/write operation initiated by the peripheral device and provide a basis for checking the input and output security of the CPU.

In one embodiment, determining whether the asynchronous event is a target asynchronous event according to the type of the asynchronous event comprises searching within a preset security level list by using the type of the asynchronous event as a keyword to obtain a security level of the asynchronous event, and it may be determined whether the asynchronous event is a target asynchronous event according to a security level currently set in the checking device and the security level of the asynchronous event. The preset security level list includes a type of an asynchronous event and a corresponding security level.

In one embodiment, a table can be used to record the types of asynchronous events that are to be aligned so that the processor checks the table to see if a recorded asynchronous event needs to be aligned. The user can also update the table according to the needs of security checking, and then set the types of asynchronous events to be aligned. For example, different table contents may be set depending on the security level.

Figure 2:
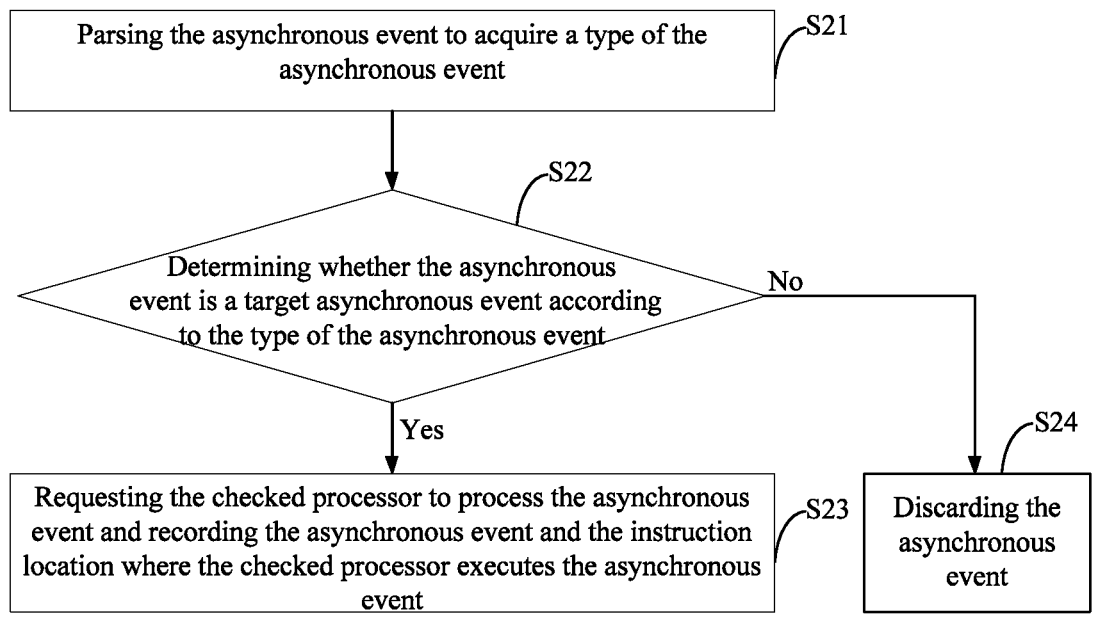
FIG. 2 is a schematic flowchart of recording an asynchronous event and an instruction position where a checked processor executes the asynchronous event according to an embodiment of the present disclosure.

In one embodiment, during recording the asynchronous event and the instruction position where the checked processor executes the asynchronous event according to the steps shown in FIG. 2, an identification of the asynchronous event and a memory address of a specific content of the asynchronous event may also be recorded. When the checking device executes the asynchronous event at the instruction position, the specific content of the asynchronous event may be obtained according to the memory address and the asynchronous event may be executed at the instruction position according to the specific content of the asynchronous event.

In one embodiment, in addition to recording the asynchronous event and the instruction position where the checked processor executes the asynchronous event, the method further comprises: storing a result of executing the asynchronous event by the checked processor for performing security checking on the checked processor, that is, determining whether the checked processor is secure according to a result of executing the asynchronous event by the checking device at the instruction position and the result of executing the asynchronous event by the checked processor. When the result of executing the asynchronous event by the checking device at the instruction position is consistent with the result of executing the asynchronous event by the checked processor, the checked processor may be determined to be secure, and if the results are inconsistent, then the checked processor may be determined to be not secure.

The following examples illustrate the specific process of determining whether the checked processor is secure. The record information of the data read/write operation between the checked processor and the peripheral device is obtained, wherein the data read/write operation includes the data read/write operation initiated by the peripheral device. It is determined whether the processor is secure according to the record information of the data read/write operation (that is, the stored result of executing the data read/write operation initiated by the peripheral device by the checked processor) and the result of executing the data read/write operation by the checking device.

If the data read/write operation is a DMA type read operation, the specific process of determining whether the checked processor is secure may include: comparing the data content of the operation data in the record information with the corresponding data content in the memory after the checking device has executed the DMA of type read operation. When both are consistent, it is determined that the checked processor is secure during executing the DMA type of read operation, otherwise it is determined that the checked processor is not secure during executing the DMA type of read operation.

If the data read/write operation is a DMA type of write operation, the specific process of determining whether the checked processor is secure may include: comparing the final running state information after the checked device has executed the DMA type of read operation in the record information with the final running state information after the checking device has executed the DMA type of read operation. When both are consistent, it is determined that the checked processor is secure during executing the DMA type of write operation.

If the data read/write operation is a P2P type of data read/write operation, the specific process of determining whether the checked processor is secure may include: comparing the data content flowing from the peripheral device to the processor in the record information with the data content flowing from the processor to the target peripheral device. When both are consistent, it is determined that the checked processor is secure during executing the P2P type of data read/write operation, otherwise it is determined that the checked processor is not secure during executing the P2P type of data read/write operation.

It should be understood that the processor security identified in this specification is a temporary security concept. In general, during checking whether a processor is secure, multiple parameters of the checked processor need to be compared. In this case, "the checked processor is secure" identified in this specification means it is transiently secure, and all parameters need to be compared to finally determine that the checked processor is secure.

Based on the same inventive concept as the method of processing an asynchronous event by a checking device shown in FIG. 1, a checking device is further provided by an embodiment of the present disclosure, as described in the following embodiment. Since the principle of solving the problem by the checking device is similar to that of the method in FIG. 1, the implementation of the checking device may refer to the implementation of the method shown in FIG. 1, and details are not described herein again.

Figure 3:
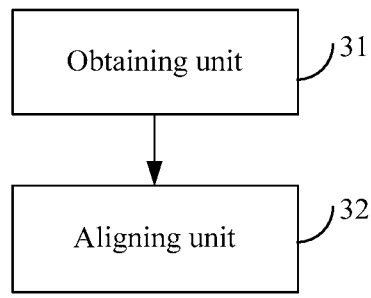
FIG. 3 is a schematic structural diagram of a checking device according to an embodiment of the present disclosure.

As shown in FIG. 3, a checking device is further provided by an embodiment of the present disclosure, which mainly includes an obtaining unit 31 and an aligning unit 32. The obtaining unit 31 is configured to obtain an instruction position where a checked processor executes an asynchronous event during a target running process, and the aligning unit 32 is configured to execute the asynchronous event at the instruction position during executing a task of the target running process in a manner conforming to predefined behavior, wherein the predefined behavior is a hardware behavior standard of the processor.

Figure 4:
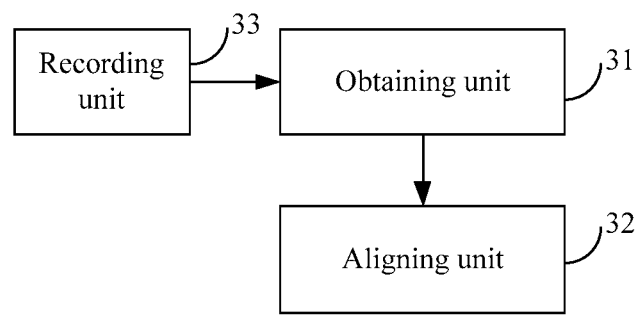
FIG. 4 is a schematic structural diagram of a checking device according to another embodiment of the present disclosure.

As shown in FIG. 4, in another embodiment, the checking device provided by an embodiment of the present disclosure further comprises a recording unit 33 configured to record the asynchronous event and the instruction position where the checked processor executes the asynchronous event.

Figure 5:
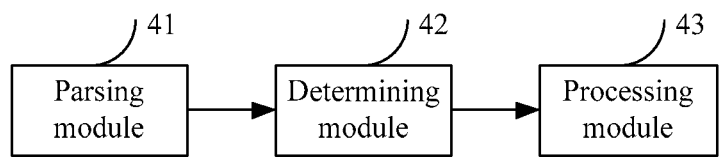
FIG. 5 is a schematic structural diagram of a recording unit according to an embodiment of the present disclosure.

The asynchronous event recording unit 33 provided by the embodiment of the present disclosure mainly includes a parsing module 41, a determining module 42 and a processing module 43, and the structure is as shown in FIG. 5. The parsing module 41 is configured to parse the asynchronous event to obtain a type of the asynchronous event; the determining module 42 is configured to determine whether the asynchronous event is a target asynchronous event according to the type of the asynchronous event; and the processing module 43 is configured to request the checked processor to process the asynchronous event and record the asynchronous event and the instruction position where the checked processor executes the asynchronous event, when the asynchronous event is a target asynchronous event.

In one embodiment, when the determining module 42 determines whether the asynchronous event is a target asynchronous event, usually, it searches within a preset security level list by using the type of the asynchronous event as a keyword to obtain a security level of the asynchronous event, and it may be determined whether the asynchronous event is a target asynchronous event according to a security level currently set in the checking device and the security level of the asynchronous event. If the security level of the asynchronous event belongs to the security levels of the asynchronous event that need to be recorded currently set in the checking device, it is determined that the asynchronous event is a target asynchronous event. The preset security level list includes a type of an asynchronous event and a corresponding security level.

In one embodiment, the recording unit 33 described above is further configured to record an identification of the asynchronous event and a memory address of a specific content of the asynchronous event; and the aligning unit 32 obtains the specific content of the asynchronous event according to the memory address and executes the asynchronous event at the instruction position.

In one embodiment, the processing module 43 is further configured to store a result of executing the asynchronous event by the checked processor.

Figure 6:
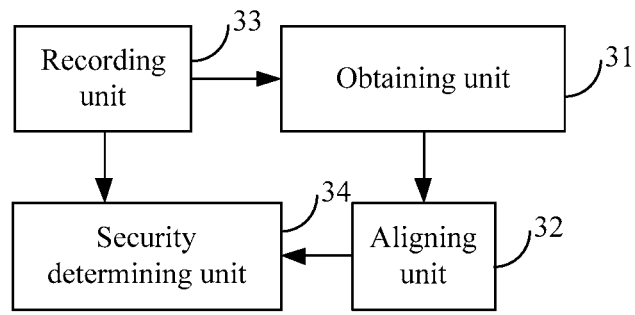
FIG. 6 is a schematic structural diagram of yet another checking device according to an embodiment of the present disclosure.

A checking device is further provided by an embodiment of the present disclosure. Compared with the checking device in FIG. 4, the embodiment of the present disclosure further includes a security determining unit 34, and the structure is as shown in FIG. 6. The security determining unit 34 is configured to determine whether the checked processor is secure according to a result of executing the asynchronous event by the checking device at the instruction position and the result of executing the asynchronous event by the checked processor.

In the embodiments of the present disclosure, obtaining an instruction position where a checked processor executes an asynchronous event during a target running process and executing the asynchronous event at the instruction position may cause the checking device and the checked processor to process the same asynchronous event at the same instruction position. In this way, during performing security checking on a processor, the method and device according to the embodiments of the present disclosure may be used to eliminate the influence of the uncertainty factor of the asynchronous event. In addition, in the digital system's verification, by using the method and device according to the embodiments of the present disclosure, the difference between verification platforms at different levels of the checked system can be narrowed so as to speed up the recurrence of problems and simplify the debugging of the checked system.

An electronic device is further provided by an embodiment of the present disclosure. The electronic device may be a desktop computer or the like, which is not limited in this embodiment. In this embodiment, the electronic device can be implemented by referring to the method shown in FIG. 1 and the device shown in FIG. 3, the content of which is incorporated here, and details are not described herein again.

Figure 7:
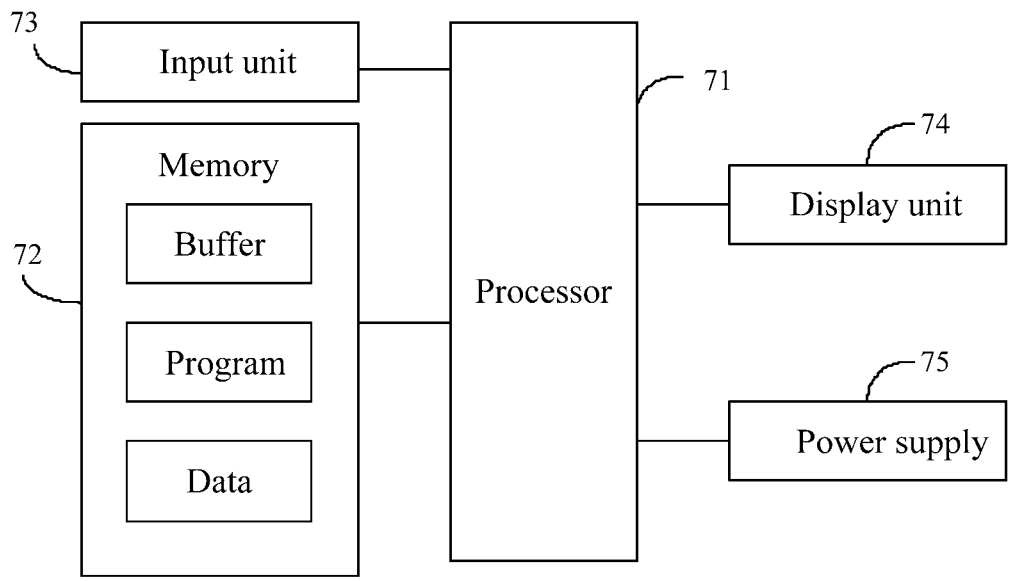
FIG. 7 is a schematic block diagram of a system configuration of an electronic device according to an embodiment of the present disclosure.

FIG. 7 is a schematic diagram of a system configuration of an electronic device according to an embodiment of the present disclosure. As shown in FIG. 7, the electronic device may include a processor 71 and a memory 72, where in the memory 72 is coupled to the processor 71. It is noted that this figure is exemplary and that other types of structures may also be used to supplement or substitute this structure for communication, checking or other functions.

In one embodiment, the function of obtaining an instruction position where a checked processor executes an asynchronous event during a target running process may be integrated into the processor 71. The processor 71 may be configured to control to: obtain an instruction position where a checked processor executes an asynchronous event during a target running process; and execute the asynchronous event at the instruction position during executing a task of the target running process in a manner conforming to predefined behavior, wherein the predefined behavior is a hardware behavior standard of the processor.

Before executing a task of the target running process in a manner conforming to predefined behavior, the processor 71 may also be configured to record the asynchronous event and the instruction position where the checked processor executes the asynchronous event, and store the recorded content in the memory 72.

During recording the asynchronous event and the instruction position where the checked processor executes the asynchronous event, the processor 71 is configured to: parse the asynchronous event to obtain a type of the asynchronous event; determine whether the asynchronous event is a target asynchronous event according to the type of the asynchronous event; and request the checked processor to process the asynchronous event and record the asynchronous event and the instruction position where the checked processor executes the asynchronous event, when the asynchronous event is a target asynchronous event.

During determining whether the asynchronous event is a target asynchronous event according to the type of the asynchronous event, it searches within a preset security level list by using the type as a keyword to obtain a security level of the asynchronous event, and it may be determined whether the asynchronous event is a target asynchronous event according to the combination of the security level currently set in the checking device and the security level of the asynchronous event. The preset security level list includes a type of an asynchronous event and a corresponding security level. If the security level of the asynchronous event is in the security level list currently set, it is determined that the asynchronous event is a target asynchronous event.

Recording the asynchronous event includes recording an identification of the asynchronous event and a memory address of a specific content of the asynchronous event, and when the asynchronous event is executed at the instruction position, the specific content of the asynchronous event may be obtained according to the memory address and the asynchronous event may be executed at the instruction position.

During recording the asynchronous event and the instruction position where the checked processor executes the asynchronous event, a result of executing the asynchronous event by the checked processor may be stored together. In one embodiment, the processor 71 is further configured to determine whether the checked processor is secure according to a result of executing the asynchronous event by the checking device at the instruction position and the result of executing the asynchronous event by the checked processor.

In one embodiment, a device separately disposed from the processor 71 may be configured to record the asynchronous event and the instruction position where the checked processor executes the asynchronous event, and/or the result of executing the asynchronous event by the checked processor, for example, the device may be configured as a chip connected to the processor 71 and the recording of the instruction position and/or the result of executing the asynchronous event by the checked processor may be implemented by the control of the processor 71.

As shown in FIG. 7, the electronic device may further include an input unit 73, a display unit 74 and a power supply 75. Please note that the electronic device does not have to include all the components shown in FIG. 7. In addition, the electronic device may further include components not shown in FIG. 7, and reference may be made to the related art.

As shown in FIG. 7, the processor 71, sometimes referred to as a controller or operation control, may include a microprocessor or other processor device and/or logic device. The processor 71 receives input and controls the operation of various components of the electronic device.

The memory 72 may be, for example, one or more of buffer, flash memory, hard drive, removable medium, volatile memory, non-volatile memory or other suitable device, and may store one or more of the configuration information of the processor 71, the instruction executed by the processor 71, recorded information such as instruction position where a checked processor executes an asynchronous event and/or the result of executing the asynchronous event by the checked processor, and the like. The processor 71 may execute a program stored in the memory 72 to realize information storage or processing and the like. In one embodiment, a buffer memory, i.e., a buffer is also included in the memory 72 to store the intermediate information.

The input unit 73 may be, for example, a key input device or a touch input device for providing input to the processor 71. The display unit 74 is configured to display a display object such as image or text. The display unit may be, for example, an LCD display, but the present disclosure is not limited thereto. The power supply 75 is configured to supply power to the electronic device.

A computer-readable instruction, when executed in an electrical device, capable of causing the electrical device to execute the method of processing an asynchronous event by a checking device as shown in FIG. 1 is further provided by the embodiments of the present disclosure.

A storage medium storing computer-readable instructions capable of causing an electrical device to execute the method of processing an asynchronous event by a checking device as shown in FIG. 1 is further provided by the embodiments of the present disclosure.

It should be understood that, in various embodiments of the present disclosure, the sequence numbers of the foregoing processes do not mean the order of execution. The execution sequence of each process should be determined by its function and inherent logic, and should not constitute any limitation on the implementation process of the embodiments of the present disclosure.

It should also be understood that in the embodiments of the present disclosure, the term "and/or" is merely a description of the relationships of associated objects, indicating that there may exist three relationships. For example, A and/or B may represent the following three cases: A exists alone, A and B exist together, and B exists alone. In addition, the character "/" herein generally means that there is an "or" relationship between the associated objects before and after the character.

Persons of ordinary skill in the art may be aware that the units and algorithm steps of each example described in conjunction with the embodiments disclosed herein may be implemented by electronic hardware, computer software, or a combination thereof. To clearly describe the interchangeability of hardware and software, the composition and the steps of the examples have been generally described in terms of their functions. Whether these functions are implemented by hardware or software depends on the specific application and design constraints of the technical solutions. A person skilled in the art may use different methods to implement the described functions for each particular application, but such implementation should not be considered as beyond the scope of the present disclosure.

Those skilled in the art may clearly understand that, for the convenience and simplicity of the description, reference may be made to corresponding processes in the foregoing method embodiments for the specific working process of the foregoing system, device, and unit, and details are not described herein again.

In the several embodiments provided in the present application, it should be understood that the disclosed system, device, and method may be implemented in other manners. For example, the device embodiments described above are merely exemplary. For example, the unit division is merely logical function division and may be otherwise divided in actual implementation. For example, multiple units or components may be combined or may be integrated into another system, or some features can be ignored or not executed. In addition, the mutual coupling or direct coupling or communication connection shown or discussed may be indirect coupling or communication connection through some interfaces, devices or units, and may also be electrical, mechanical or other forms of connection.

The units described as separate components may or may not be physically separated. The components displayed as units may or may not be physical units, that is, may be located in one place or may also be distributed to multiple network units. Some or all of the units may be selected according to actual needs to achieve the objectives of the solutions in the embodiments of the present disclosure.

In addition, each functional unit in each embodiment of the present disclosure may be integrated in one processing unit, or each unit may exist alone physically, or two or more units may be integrated in one unit. The above-mentioned integrated unit may be implemented in the form of hardware or in the form of software functional unit.

When the integrated unit is implemented in the form of software functional unit and is sold or used as an independent product, the integrated unit may be stored in a computer-readable storage medium. Based on such understanding, the technical solution of the present disclosure essentially, or the part contributing to the prior art, or all or part of the technical solution may be embodied in the form of a software product stored on a storage medium including several instructions for enabling a computer device (which may be a personal computer, a server, a network device, or the like) to execute all or part of the steps of the method according to each embodiment of the present disclosure. The foregoing storage medium includes various medium capable of storing program code such as a USB flash disk, a removable hard disk, a read-only memory (ROM), a random access memory (RAM), a magnetic disk, or an optical disk.

In the present disclosure, specific embodiments are used to describe the principle and implementation manners of the present disclosure. The description of the foregoing embodiments is merely used to help understand the method and core idea of the present disclosure. Meanwhile, for those skilled in the art, the idea of the present disclosure may have variations in specific implementation manners and application scope. To sum up, the content of the description should not be construed as a limitation on the present disclosure.

What is claimed is:

1. A method for processing an asynchronous event by a checking device, comprising:
    detecting an asynchronous event that occurs during a target running process of a checked processor;
    parsing the asynchronous event to obtain a type of the asynchronous event;
    determining whether the asynchronous event is a target asynchronous event according to the type of the asynchronous event;
    when the asynchronous event is the target asynchronous event, requesting the checked processor to process the asynchronous event, recording the asynchronous event, recording an instruction position where the checked processor executes the asynchronous event during the target running process, and recording a result of the asynchronous event executed by the checked processor, wherein the target running process is a sub-process of a real-time running process of the checked processor, and the recording is implemented through hardware, virtual machine software, or an interrupt service in an operating system layer;
    obtaining the instruction position where the checked processor executes the asynchronous event during the target running process;
    executing the asynchronous event, by the checking device, at the instruction position during executing a task of the target running process in a manner conforming to a predefined behavior, wherein the predefined behavior is a hardware behavior standard of the processor; and
    determining that the checked processor is secure during execution of the asynchronous event by the checked processor, if the result of the asynchronous event executed by the checking device at the instruction position is consistent with the result of the asynchronous event executed by the checked processor.

2. The method according to claim 1, wherein, determining whether the asynchronous event is a target asynchronous event according to the type of the asynchronous event comprises:
    searching within a preset security level list by using the type of the asynchronous event as a keyword to obtain a security level of the asynchronous event, wherein the preset security level list includes a type of an asynchronous event and a corresponding security level; and
    determining whether the asynchronous event is a target asynchronous event according to a security level currently set in the checking device and the security level of the asynchronous event.

3. The method according to claim 1, wherein, the recording an asynchronous event that occurs during a target running process of a checked processor comprises:
    recording an identification of the asynchronous event and a memory address of a specific content of the asynchronous event; and
    executing the asynchronous event at the instruction position comprises: obtaining the specific content of the asynchronous event according to the memory address and executing the asynchronous event at the instruction position according to the specific content of the asynchronous event.

4. A checking device system, comprising:
    a checked processor;
    a recording unit comprising a processing module configured to detect an asynchronous event that occurs during a target running process of the checked processor, a parsing module configured to parse the asynchronous event to obtain a type of the asynchronous event, and a determining module configured to determine whether the asynchronous event is a target asynchronous event according to the type of the asynchronous event, wherein the recording unit is configured to, when the asynchronous event is the target asynchronous event, request the checked processor to process the asynchronous event, record the asynchronous event, record an instruction position where the checked processor executes the asynchronous event during the target running process, and record a result of the asynchronous event executed by the checked processor, wherein the target running process is a sub-process of a real-time running process of the checked processor, and the recording is implemented through hardware, virtual machine software or an interrupt service in an operating system layer;

an obtaining unit configured to obtain the instruction position, from the recording unit, where the checked processor executes the asynchronous event during the target running process;

an aligning unit configured to execute the asynchronous event at the instruction position during executing a task of the target running process in a manner conforming to predefined behavior, wherein the predefined behavior is a hardware behavior standard of the processor; and a security determining unit configured to determine that the checked processor is secure during execution of the asynchronous event by the checked processor, if the result of the asynchronous event executed by the aligning unit at the instruction position is consistent with the result of the asynchronous event executed by the checked processor.

5. The checking device system according to claim 4, wherein, the determining module is configured to:

search within a preset security level list by using the type of the asynchronous event as a keyword to obtain a security level of the asynchronous event, wherein the preset security level list includes a type of an asynchronous event and a corresponding security level; and determine whether the asynchronous event is a target asynchronous event according to a security level currently set in the checking device and the security level of the asynchronous event.

6. The checking device system according to claim 4, wherein, during recording the asynchronous event that occurs during the target running process of the checked processor, the recording unit is configured to record an identification of the asynchronous event and a memory address of a specific content of the asynchronous event; and the aligning unit is further configured to obtain the specific content of the asynchronous event according to the memory address and execute the asynchronous event at the instruction position according to the specific content of the asynchronous event.

7. A non-transitory computer-readable storage medium storing instructions capable of executing the method according to claim 1.

8. A non-transitory computer-readable storage medium storing instructions capable of executing the method according to claim 2.

9. A non-transitory computer-readable storage medium storing instructions capable of executing the method according to claim 3.

* * * * *